United States Patent
Begeja et al.

(10) Patent No.: US 9,246,695 B2
(45) Date of Patent: Jan. 26, 2016

(54) METHOD AND APPARATUS FOR PROVIDING VIRTUAL CLOSED CIRCUIT TELEVISION

(75) Inventors: Lee Begeja, Gilette, NJ (US); Benjamin J. Stern, Morris Township, NJ (US); Ganesh K. Subramaniam, Bridgewater, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 47 days.

(21) Appl. No.: 13/615,149

(22) Filed: Sep. 13, 2012

(65) Prior Publication Data

US 2013/0007795 A1      Jan. 3, 2013

Related U.S. Application Data

(63) Continuation of application No. 11/479,705, filed on Jun. 30, 2006, now Pat. No. 8,284,915.

(51) Int. Cl.

| H04N 7/16 | (2011.01) |
|---|---|
| H04N 7/18 | (2006.01) |
| H04N 7/173 | (2011.01) |
| H04L 12/18 | (2006.01) |
| H04N 7/15 | (2006.01) |
| H04N 21/4788 | (2011.01) |
| H04N 21/6405 | (2011.01) |

(52) U.S. Cl.
CPC ............... *H04L 12/185* (2013.01); *H04N 7/15* (2013.01); *H04N 7/18* (2013.01); *H04N 21/4788* (2013.01); *H04N 21/6405* (2013.01)

(58) Field of Classification Search
None
See application file for complete search history.

(56) References Cited

U.S. PATENT DOCUMENTS

| 3,668,307 | A | * | 6/1972 | Face et al. ...................... 725/119 |
| 5,374,952 | A | * | 12/1994 | Flohr ....................... H04N 7/15 348/14.08 |
| 6,073,235 | A | * | 6/2000 | Foladare ................. H04L 9/083 370/320 |
| 6,112,083 | A | * | 8/2000 | Sweet et al. ................ 455/426.1 |
| 6,249,241 | B1 | * | 6/2001 | Jordan et al. ..................... 342/41 |
| 6,601,237 | B1 | * | 7/2003 | Ten Kate et al. ................. 725/47 |
| 6,965,593 | B2 | * | 11/2005 | Donahue et al. .............. 370/352 |
| 7,221,387 | B2 | * | 5/2007 | Fernandez .......... H04L 12/1813 348/14.08 |

(Continued)

FOREIGN PATENT DOCUMENTS

WO      WO-03/003708      1/2003

OTHER PUBLICATIONS

PCT Search Report and Written Opinion for PCT/US2007/070895; Dec. 19, 2002, consists of 12 pages.

(Continued)

*Primary Examiner* — Jonathan V Lewis

(57) ABSTRACT

A method and apparatus for providing a private broadcast channel service, e.g., a virtual closed circuit television service, on packet networks such as Service over Internet Protocol (SoIP) networks are disclosed. For example, a customer subscribes to the private broadcast channel service for a group having a plurality of confirmed members who have confirmed their desire to participate. The network service provider enables one or more of the group members to upload media content to the service provider's network. The service provider then broadcasts the uploaded media content to all the confirmed members such that each confirmed member may view the media content by simply tuning to the appropriate channel assigned for the private broadcast channel service.

20 Claims, 5 Drawing Sheets

(56) References Cited

U.S. PATENT DOCUMENTS

| | | | |
|---|---|---|---|
| 7,310,730 B1* | 12/2007 | Champagne | H04L 12/185 709/223 |
| 7,499,995 B2* | 3/2009 | Armstrong | 709/224 |
| 7,656,824 B2* | 2/2010 | Wang | H04L 12/185 348/E7.083 |
| 8,284,915 B2 | 10/2012 | Begeja et al. | |
| 2002/0010518 A1* | 1/2002 | Reid et al. | 700/31 |
| 2002/0010922 A1 | 1/2002 | Darin et al. | |
| 2002/0042923 A1* | 4/2002 | Asmussen et al. | 725/92 |
| 2002/0174424 A1* | 11/2002 | Chang et al. | 725/9 |
| 2003/0014750 A1* | 1/2003 | Kamen | 725/25 |
| 2003/0188316 A1* | 10/2003 | DePrez | 725/87 |
| 2004/0165713 A1* | 8/2004 | Leighton | 379/225 |
| 2005/0141542 A1 | 6/2005 | Handekyn et al. | |
| 2005/0149364 A1 | 7/2005 | Ombrellaro | |
| 2006/0123455 A1* | 6/2006 | Pai et al. | 725/133 |
| 2006/0233171 A1 | 10/2006 | Murray et al. | |
| 2006/0253330 A1* | 11/2006 | Maggio et al. | 705/14 |
| 2007/0199019 A1* | 8/2007 | Angiolillo et al. | 725/39 |
| 2007/0239825 A1 | 10/2007 | Walter | |
| 2007/0262860 A1* | 11/2007 | Salinas et al. | 340/539.12 |

OTHER PUBLICATIONS

Office Action from CA 2,655,935, Aug. 1, 2012, pp. 1-3.

* cited by examiner

METHOD AND APPARATUS FOR PROVIDING VIRTUAL CLOSED CIRCUIT TELEVISION

This application is a continuation of U.S. patent application Ser. No. 11/479,705, filed Jun. 30, 2006, which is currently allowed, and is herein incorporated by reference in its entirety.

The present invention relates generally to communication networks and, more particularly, to a method for sharing video content, e.g., providing a closed circuit television channel in packet networks such as Service over Internet Protocol (SoIP) networks.

BACKGROUND OF THE INVENTION

The Internet has emerged as a critical communication infrastructure, carrying traffic for a wide range of applications. More and more customers are utilizing these networks to obtain a variety of services such as voice and data. The Internet based voice and data services offer consumers much greater flexibility and control. For example, users have flexibility to send instant messages among a predetermined list of addresses. On the other hand, videos are typically shared by posting the content to a website and enabling anyone with the address to access the website. However, customers may wish to share the content only among a predefined group, but the participants of the group may not all be web-enabled. For example, a parent may wish to enable relatives in various places to tune to a television channel and view a video regardless of their ability to use the Internet.

Therefore, there is a need for a method and apparatus that enables a service provider, e.g., an IP service provider, to provide a virtual closed circuit television service.

SUMMARY OF THE INVENTION

In one embodiment, the present invention discloses a method and apparatus for providing a private broadcast channel service, e.g., a virtual closed circuit television service, on packet networks such as Service over Internet Protocol (SoIP) networks. For example, a customer subscribes to the private broadcast channel service for a group having a plurality of confirmed members who have confirmed their desire to participate. The network service provider enables one or more of the group members to upload media content to the service provider's network. The service provider then broadcasts the uploaded media content to all the confirmed members such that each confirmed member may view the media content by simply tuning to the appropriate channel assigned for the private broadcast channel service.

In one embodiment, the service provider may also provide the group members with a conferencing service such that group members could interact with each other in real time. In another embodiment, if a member is not watching at the time of the broadcast or wishes to have the broadcast media content recorded, then the service provider may enable the broadcast media content to be recorded. In another embodiment, the service provider may enable multiple groups of members for a private broadcast channel service to be combined for a specific broadcast.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
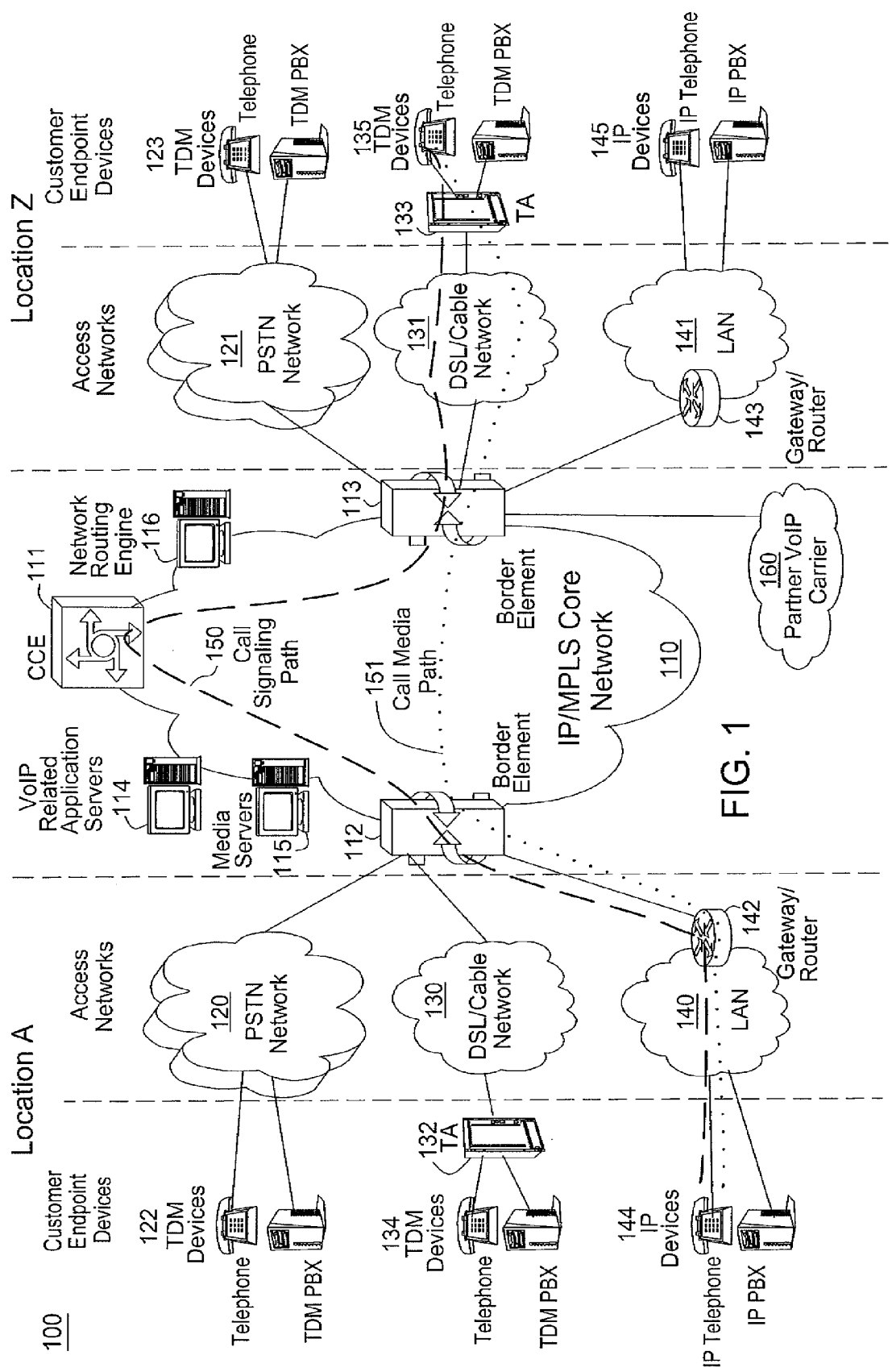
FIG. 1 illustrates an exemplary Voice over Internet Protocol (VoIP) network related to the present invention.
Figure 2:
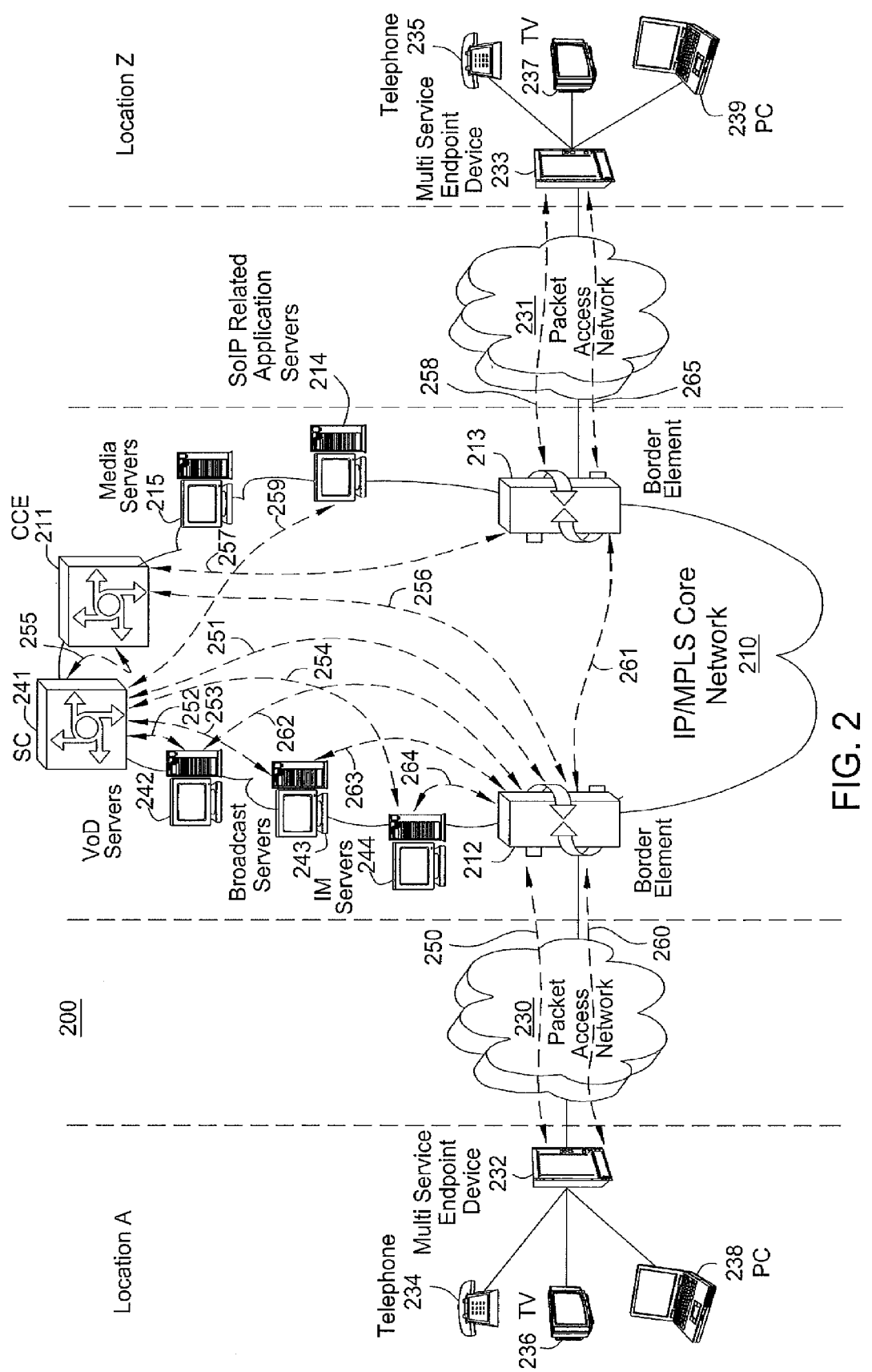
FIG. 2 illustrates an exemplary Service over Internet Protocol (SoIP) network related to the present invention.

The present invention broadly discloses a method and apparatus for sharing video content, e.g., providing a closed circuit Television (TV) channel service (or broadly defined as a private broadcast channel service) on packet networks such as Service over Internet Protocol (SoIP) networks. Although the present invention is discussed below in the context of transporting packets in VoIP and SoIP networks, the present invention is not so limited. Namely, the present invention can be adapted to any packet networks, cable networks, wireless networks and the like. Furthermore, the exemplary networks as shown in FIG. 1 and FIG. 2 below are only illustrative and should not be interpreted as a limitation to the present invention. Namely, any packet networks that are capable of providing the video sharing service as disclosed below are within the scope of the present invention.

To better understand the present invention, FIG. 1 illustrates communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by the particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary inter-working functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the called party accepts the call at location Z, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The network shown in FIG. 1 can be extended to become a SoIP network that supports multi-service applications including, but not limited to, video services. FIG. 2 illustrates communications architecture 200 having an example network, e.g., a packet network such as a SoIP network related to the present invention. A SoIP network supports multi-service applications including voice, data, and video services. In one embodiment, a SoIP network that supports video services is described below. In this SoIP network, voice services supported include, but are not limited to, VoIP services; data services supported include, but are not limited to, Instant Messaging (IM), electronic mail (email), internet access services, or any other IP based applications; and video services include, but are not limited to, Video on Demand (VoD), broadcast video, and video conferencing services.

A SoIP network that supports video services comprises an intelligent multi-service endpoint device connected via packet access networks to a service provider's SoIP core infrastructure employing Internet Protocol (IP) and/or Multi-Protocol Label Switching (MPLS) Protocols. Broadly defined, a SoIP network is a network that is capable of carrying voice, video, and data signals as packetized data over an IP network. The present invention is described below in the context of an illustrative SoIP network that supports video services. Thus, this particular illustrative architecture should not be interpreted as limiting the present invention.

Multi-service endpoint devices 232 and 233 are IP based intelligent endpoint devices supporting voice, video, and data applications. Multi-service endpoint devices 232 and 233 are signaling endpoints of application sessions, e.g. a VoIP session endpoint, an instant messaging endpoint, or a video session endpoint. In one embodiment, a multi-service endpoint device is a standalone device that can be connected to home electronic appliances such as, but is not limited to, telephone 234 and 235, TV 236 and 237, or Personal Computer (PC) 238 and 239. In another embodiment, a multi-service endpoint device can be integrated with a TV, a PC, or any home appliances with a display.

The access networks are packet based. Packet based access networks 230 and 231 use, but are not limited to, Frame Relay, ATM, Ethernet, IP, DSL or Cable broadband access network technologies to interconnect a multi-service endpoint device to a SoIP network that supports video, data and voice services.

The core SoIP infrastructure that supports video services comprises of several key components, such the Border Element (BE) 212 and 213, the Call Control Element (CCE) 211, SoIP related Application Servers (AS) 214, Media Servers (MS) 215, Session Controller (SC) 241, Video of Demand (VoD) Servers 242, Broadcast Servers (243), and Instant Messaging (IM) Servers 244. A BE resides at the edge of the SoIP core infrastructure and interfaces with customers endpoints over various types of access networks. The functions supported by a BE include those supported by a BE as previously described in network 100 and FIG. 1. In addition, in a SoIP network that supports video services, a BE also serves as a gateway between a multi-service endpoint device used by a subscriber and the SoIP core network that supports video services. All application sessions initiated by a SoIP subscriber must gain entry to the SoIP core network via a BE. The functions supported by a CCE and a MS are the same as those previously described in network 100 and FIG. 1. A Session Controller (SC) resides within the SoIP infrastructure and is connected to the BEs using an IP based signaling protocol such as, but is not limited to, Session Initiation Protocol (SIP). A SC is responsible for setting up all application session requests, such as VoIP call requests, video session requests, or data session requests, originated by a customer within the network and interacts with, if necessary, the appropriate SoIP related AS in order to complete an application session that requires certain service specific features originated by a customer. A SC also keeps track of all sessions initiated by a customer for session management and billing purposes. The functions supported by a SoIP related AS include those supported by a VoIP AS as previously described in network 100 and FIG. 1. In addition, a SoIP AS also supports all video specific application features. A VoD Server is responsible for supporting video on demand video session requests originated by a customer and sends the requested streaming video contents, such as a movie, to the customer. A broadcast server is responsible for supporting broadcast video sessions originated by a customer. The broadcast server also sends streaming broadcast video contents, such as TV channels, to the customer. The VoD Server and the Broadcast Server send streaming video contents to multi-service endpoint devices using compression technologies including, but are not limited to, Moving Picture Experts Group (MPEG) 2, MPEG 4, MPEG 7, MPEG 21. An IM Server is responsible for supporting IM applications involving multiple users. Instant Messaging is a form of electronic communication that involves immediate typed text correspondence between two or more users over the Internet who are online simultaneously. IM is a text-based computer conference over the Internet between two or more people who are online at the same time.

In order to illustrate how the different components in a SoIP network operate to support video services, the following scenarios are used to illustrate how voice, data, and video sessions are setup between the SoIP network and a customer endpoint. In one embodiment, a customer using a multi-service endpoint device 232 at location A places a VoD session request to the SoIP network that supports video services using TV 236. During the session initiation, a setup-signaling message is sent from multi-service endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoD session; therefore, the request will be forwarded to VoD Server 242 using signaling path segment 252. SC 241 may interact with AS 214 using signaling path segment 259 to verify customer's subscription information or to retrieve video specific applications or data in order to complete the session request. Once the VoD session is verified, VoD Server 242 sends the requested VoD streaming contents to BE 212 using data path segment 262. BE 212 then forwards the requested VoD streaming contents to multi-service endpoint 232 using data path segment 260. Similarly, a customer at location Z using TV 237 connected to multi-service endpoint device 233 can request a VoD session via SC 241 with streaming VoD contents sent by VoD Server 242. Note that a VoD server may be placed closer to end users in a packet access network to serve multi-service endpoints in an alternative embodiment.

In another embodiment, a customer using multi-service endpoint device 232 at location A places a broadcast video session request to the SoIP network that supports video services using TV 236. During the session initiation, a setup-signaling message is sent from multi-service endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a broadcast video session for a particular premium TV channel; therefore, the request will be forwarded to Broadcast Server 243 using signaling path segment 253. SC 241 may interact with AS 214 using signaling path segment 259 to verify customer's subscription information or to retrieve video specific applications or data in order to complete the session request. Once the broadcast session is verified, Broadcast Server 243 sends the requested broadcast video streaming contents to BE 212 using data path segment 263. BE 212 then forwards the requested broadcast video streaming contents to multi-service endpoint 232 using data path segment 260. Similarly, a customer at location Z using TV 237 connected to multi-service endpoint 233 can request a broadcast video session via SC 241 with streaming broadcast video contents sent by Broadcast Server 243. Note that a Broadcast server may be placed closer to end users in a packet access network to serve multi-service endpoints in an alternative embodiment.

In another embodiment, a customer using multi-service endpoint device 232 at location A places an IM session request to the video network using PC 238. During the session initiation, a setup signaling message is sent from multi-service endpoint device 232 to BE 212 using signaling path segment 250. BE 212 will then send a setup signaling message, including login and password information of the user, to SC 241 using signaling path segment 251. SC 241 processes the session requests and forwards the request to the appropriate server for further processing. In this case, the request to sign on an IM session; therefore, the request will be forwarded to IM Server 244 using signaling path segment 254. SC 241 may interact with AS 214 using signaling path segment 259 to verify customer's subscription information or to retrieve IM specific applications or data in order to complete the session request. Once the IM session is verified, IM Server 244 establishes the requested IM data path to multi-service endpoint 232 via BE 212 using data path comprising data path segments 260 and 264. Similarly, a customer at location A using TV 236 connected to multi-service endpoint 232 or a customer at location Z using PC 239 or TV 237 connected to multi-service endpoint 233 can request an IM session via SC 241 with IM functions provided by IM Server 244.

In another embodiment, a customer using multi-service endpoint device 232 at location A places a VoIP session request destined to multi-service endpoint device 233 via the SoIP network that supports video services using telephone 234. During the session initiation, a setup signaling message is sent from multi-service endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoIP session for a call destined to a called party at location Z; therefore, the request will be forwarded to CCE 211 using signaling path segment 255.

CCE may interact with AS 214 using signaling path segment 259 to verify customer's subscription information or to retrieve VoIP specific applications or data in order to complete the session request. The signaling flows to establish a VoIP call between multi-service endpoint device 232 and 233 is similar to those described previously in network 100 and FIG. 1.

In one embodiment, the Application Server (AS) functions as a SIP back-to-back user agent. Since BE 213 needs to be involved in completing the call; CCE 211 sends another call setup message, such as a SIP-INVITE message if SIP is used, to BE 213 using signaling path segment 257. Upon receiving the call setup message, BE 213 forwards the call setup message, via packet access network 231 to multi-service endpoint device 233 using signaling path segment 258. The multi-service endpoint device 233 then identifies telephone 235 and rings that telephone. Once the called party accepts the call at location Z, a call acknowledgement signaling message, such as a SIP 200 OK response message if SIP is used, is sent in the reverse direction back to the CCE 211.

After the CCE 211 receives the call acknowledgement message, it will then send a call acknowledgement signaling message, such as a SIP 200 OK response message if SIP is used, toward the calling party at location A using signaling path comprising signaling path segments 256 and 250 via BE 212. In addition, the CCE 211 also provides the necessary information of the call to BE 212 and BE 213 so that the call data exchange can proceed directly between BE 212 and BE 213. CCE 211 also provides the call completion status of a VoIP call to SC 241. The call media path comprising media path segment 260, 261, and 265 are illustratively shown in FIG. 2. Note that the call signaling path and the call media path are different because once a call has been setup up between two multi-service endpoint devices, SC 241 and CCE 211 don't need to be in the data path for actual direct data exchange.

As extremely high bandwidth access networks become more accessible to residential subscribers, the high bandwidth networks enable service providers to integrate voice, video, and data, thereby providing more convenience for end customers and creating new service opportunities. The Internet based voice and data services offer consumers much greater flexibility and control. For example, users have flexibility to send instant messages among a predetermined list of addresses. Similarly, service providers may offer teleconference services for groups. On the other hand, videos are typically shared by posting the content to a website and enabling anyone with the address to access the website. However, customers may wish to share the content only among a pre-defined group, but the participants of the group may not all be web-enabled. For example, a parent may wish to enable relatives in various places to tune to a television channel and view a video regardless of their ability to use the Internet. Therefore, there is a need for a method and apparatus that enables a network service provider to provide a service that enables customers to share video, e.g., to obtain a virtual closed circuit television channel.

The current invention discloses a method and apparatus for providing a virtual closed circuit television channel on packet networks. In order to clearly illustrate the teachings of the current invention, the following networking terminologies will first be described:

A set-top box; and

Closed circuit television channel.

A set-top box is a device with input and output interfaces that enables a user to receive video channels. The interfaces are employed for communicating with a display device (e.g., a television or a monitor), the user (e.g., a remote controller), a service provider's network, and/or other home-network components. The set-top box may contain a tuner for channel selection by the user, a display for indicating the selected channel to the user, an interface for changing the channel (up/down buttons), a processor for controlling the various functions and a data modem for interacting with the service provider. If the set-top box has a remote controller, then it also has one or more infrared sensors to receive user input via the remote controller.

Closed circuit television channel refers to a channel containing broadcast video directed towards a specific list of destinations. Namely, the broadcast video on a closed circuit television channel is only directed to a specific group of viewers.

Figure 3:
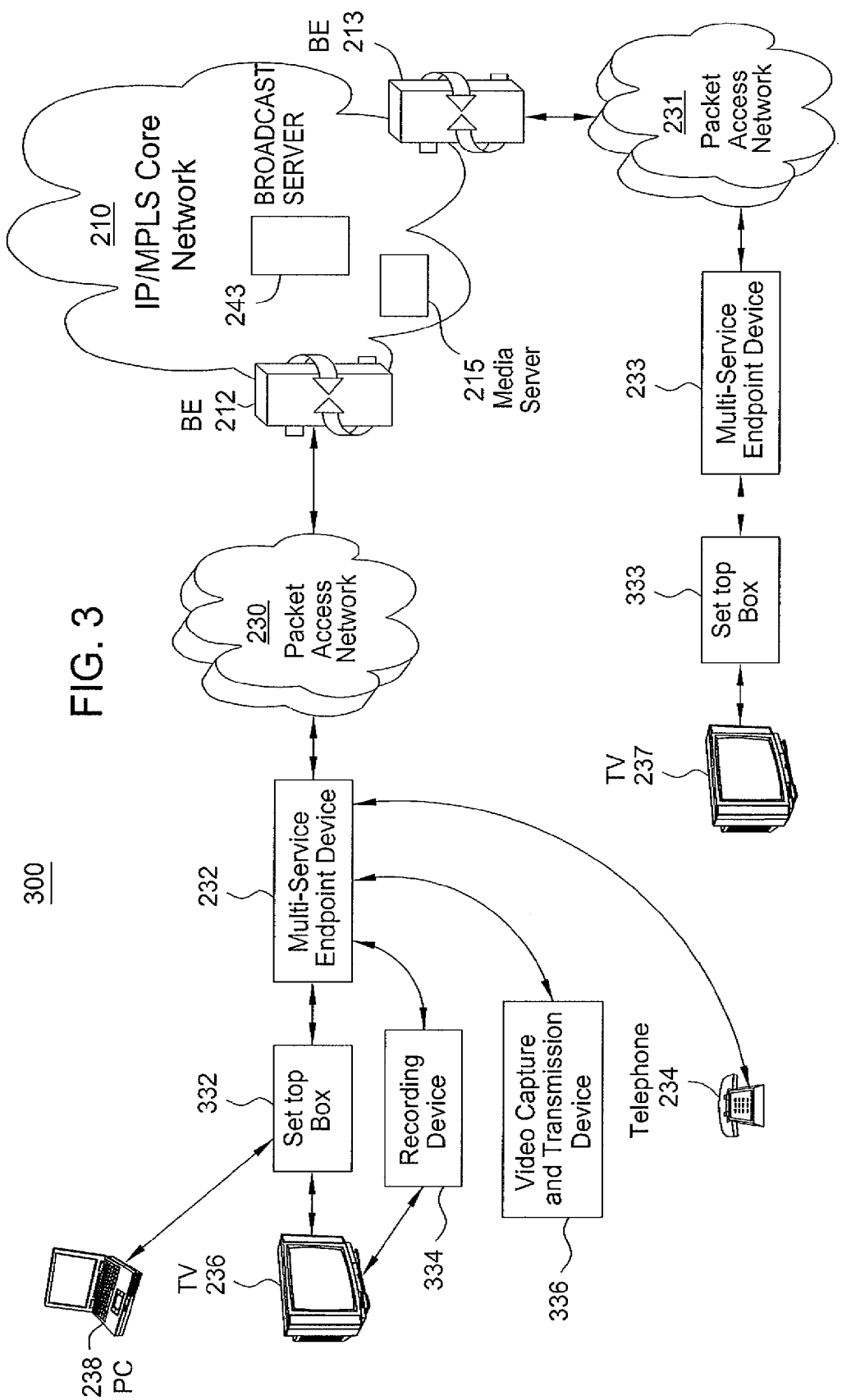
FIG. 3 illustrates an exemplary network with one embodiment of the invention for providing closed circuit television channel service.

FIG. 3 illustrates an exemplary network 300 of the present invention to provide a closed circuit TV channel. For example, the customer may use an endpoint device (e.g., a PC) 238 to request for a closed circuit TV channel service for a group, to establish a group and to provide preferences for the service. Namely, the customer may contact a network service provider to subscribe to a closed circuit TV channel service. As part of the registration process, the customer may have to define a group (e.g., a group of individuals or subscribers who are current customers of the network service provider) and to select one or more preferences associated with the service, e.g., passwords, level of access (e.g., receiving video only and/or transmitting video only), quality of service (e.g., level of resolutions), conferencing capability (e.g., audio conferencing), and the like.

In general, the customer is using a display, e.g., a TV 236 and a set-top box 332 to access broadcast channels. The customer may also use a video capture and transmission device 336 to upload video content for viewing by members of the group. The customer may also have a recording device 334 to record video transmitted on the closed circuit channel. In one embodiment, the video capture and transmission device 336, the computer 238, the set-top box 332, and the recording device 334 are connected to a multi-service endpoint device 232. In one embodiment, a telephone 234 is also connected to the multi-service endpoint device 232 for providing audio communication capability among viewers of the closed circuit TV channel. It should be noted that one or more of the customer premise equipment, e.g., a computer, a recording device, a video capture and transmission device, and a telephone, can also be deployed at any member location as well (not shown).

The multi-service endpoint device 232 is connected to a packet access network 230. The access network 230 accesses the IP/MPLS core network 210 via a border element 212.

Similarly, a member of the group may use a display, e.g., a TV 237 and a set-top box 333 to access broadcast channels including the closed circuit TV channel. The set-top box 333 is connected to a multi-service endpoint device 233 that is connected to a packet access network 231. The access network 231 accesses the IP/MPLS core network 210 via a border element 213.

In one embodiment, the service provider utilizes a broadcast server 243 to provide a closed circuit TV channel service. The broadcast server 243 utilizes the media server 215 for interacting with members of the group sharing the closed circuit television channel. In one embodiment, the content from the video capture and transmission device 336 is received by the broadcast server 243. In turn, the broadcast server 243 identifies the members of the group for the closed circuit television service and broadcasts the content on a predetermined channel. It should be noted that the received video can be stored temporarily until a specified broadcast time.

Once the customer has provided an anticipated or potential list of members for the service during the registration process, the network service provider may notify each anticipated group member. For example, the notification may be via email, streaming across the TV screen, telephone call, and the like, prior to establishing the closed circuit TV channel service for the group. In turn, the service provider may gather various information from the anticipated list of members, e.g., identifying those individuals who wish to be members of the group, and determining the capabilities of the endpoint devices for each member of the group (e.g., web-enabled, TV with set-top box, recorder, audio devices, video capture and transmission device, etc.). For example, the service provider may contact each member of the group to provide the member with service information, e.g., the channel number for viewing, and to enable recording devices of members to automatically record the transmission on the closed circuit channel, etc.

In operation, when the customer or a group member initiates a closed circuit TV broadcast, the service provider enables the content to be transmitted to all members of the group via the broadcast server 243. The media server 215 can be used to broadcast an announcement to all members of the group. For example, the announcement may contain relevant information associated with the broadcast, e.g., a title, a brief description, a scheduled time, and the like. The broadcast server may also activate other services such as teleconference, if necessary. Thus, members of the group may interject comments via audio links for group dynamics for a live broadcast. If a member is not watching at the time of the broadcast or prefers to view the content at a later time, then the recording device 334 can be activated to record the content for the member. Thus, members of the group are able to watch the closed circuit TV channel without being required to utilize the web, i.e., the members can participate by simply turning on the TV. In one embodiment, the audio links such as via the telephone (or more broadly a speaker and a microphone that is deployed in the member premise, e.g., in the set-top box) will allow members who do not have video capture devices (or where the video capture devices are turned off) to still participate in the closed circuit TV channel broadcast.

In one embodiment, the service provider may enable multiple groups to be combined for specific broadcasts. For example, each den of a boy scout pack may form a separate group where a den meeting can be conducted via a closed circuit TV channel broadcast. However, for pack meetings, a plurality of dens having the closed circuit TV channel service can be linked or combined into a much larger broadcast.

Figure 4:
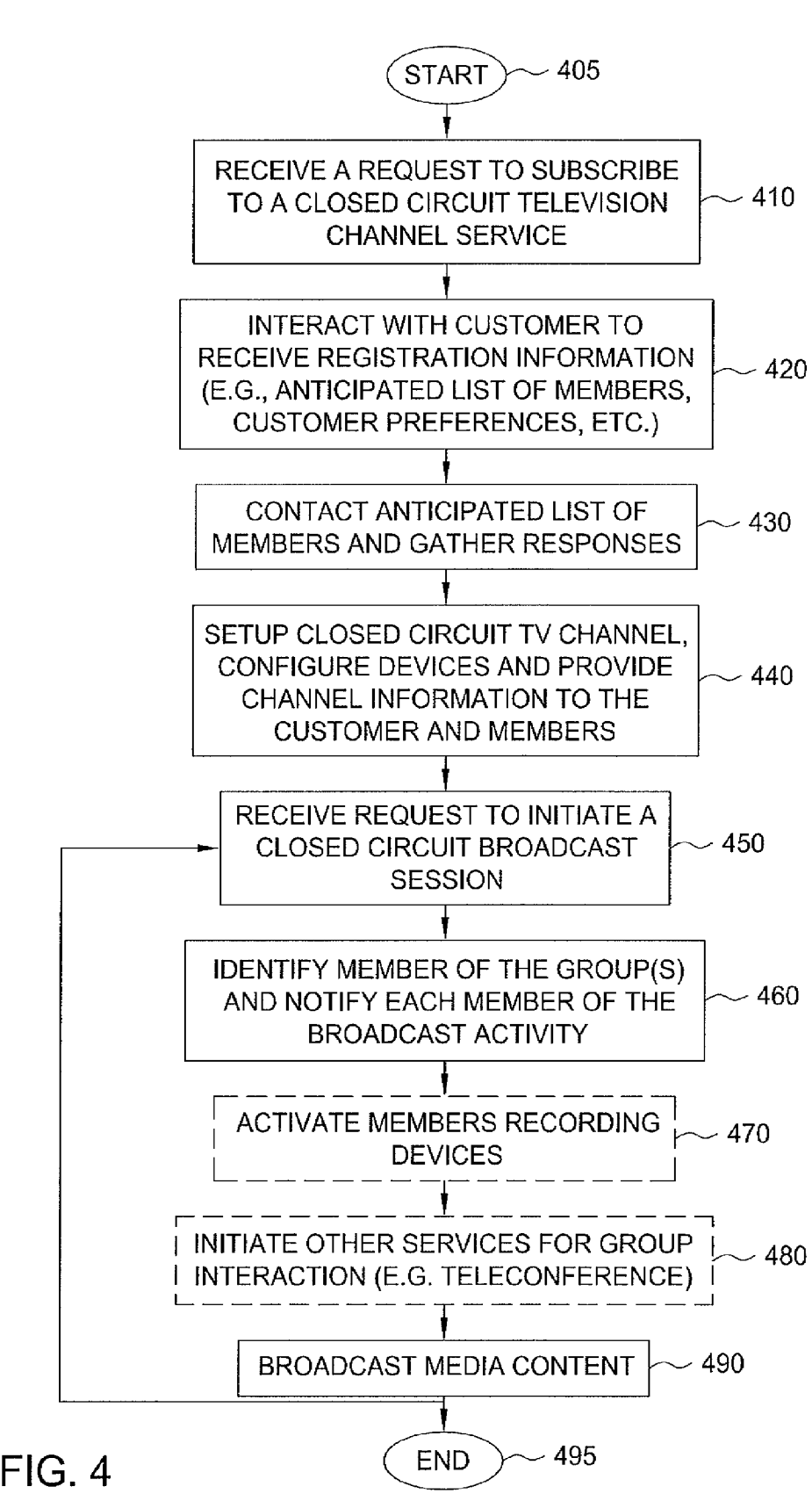
FIG. 4 illustrates a flowchart of the method for providing closed circuit television channel service.

FIG. 4 illustrates a flowchart of a method 400 for providing a virtual closed circuit TV channel service. In one embodiment, method 400 can be implemented by a service provider to provide a virtual closed circuit TV channel service. The service provider enables the customer and/or members of a predefined group to provide media content to the service provider such that the media content is then broadcasted on a closed circuit channel.

Method 400 starts in step 405 and proceeds to step 410. In step 410, method 400 receives a request from a customer for a closed circuits television channel service. For example, the customer may call or send an email to the service provider to subscribe to the service.

In step 420, method 400 interacts with the customer to receive registration information, e.g., an anticipated list of members for the group, contact information of the members, and service preferences (e.g., level of access, conferencing capability, quality of service, e.g., resolution, and so on). For example, the customer may provide ten anticipated members and provide the email addresses, phone numbers of the anticipated members. The customer may also specify a teleconference service to be invoked during broadcast to allow members to interact with each other during the broadcast. The level of access or type of service for the members may also be provided. For example, the customer may enable all members to view broadcasts, allow some members to also provide content, allow all members to have access to the teleconference, allow only some members to join the teleconference, etc. For example, an enterprise customer with multiple locations may utilize the service for broadcasting content to all locations while enabling only a limited set of location to provide content. The enterprise customer may also allow only some employees (such as managers) to interject comments via the teleconference.

In step 430, method 400 contacts the anticipated members and gathers responses (e.g., confirmation to join the group). For example some anticipated members might prefer not to join, others might want only to view broadcast but not supply content, and so on. The service provider interacts with each potential member, extends the request from the customer and gathers the responses prior to establishing the closed circuit TV channel. The service provider also gathers information needed for configuring the anticipated member's devices. For example, an anticipated member may wish the broadcast on the closed circuit TV channel to be recorded if the member is currently tuned to another channel or when the TV is not turned on. Another member may wish all the broadcast on the closed circuit channel to be recorded whether or not he/she is watching, and so on.

In step 440, method 400, establishes the closed circuit channel service in accordance with user preferences, configures member devices, and provides the customer and members with the channel number for the closed circuit TV channel. For example, the service provider determines the anticipated members who wish to join the group, sets up a channel (e.g. channel number 999), and then lets all the members know the closed circuit broadcast is provided on channel 999 (e.g., configuring members' set-top box to recognize a code that will allow viewing of content on channel 999).

In step 450, method 400 receives a request to initiate a closed circuit broadcast session for a group. For example, the customer sends a request to the broadcast server. If the customer has allowed other members to initiate a broadcast in step 420, the request to initiate a broadcast may also be received from other members of the group. The service provider determines the capabilities to be offered to the customers and other members of a group. For example, other members of the group may have different pay plans for the service depending on their need to provide content. Thus, the service provider may have a separate subscription plan for members who intend to provide content to the closed circuit broadcast channel versus those who do not intend to provide content.

In step 460, method 400 identifies members of the group for the broadcast and notifies each member of the activity. For example, the service provider may send a notification, e.g., a message to scroll across the TV indicating that a broadcast activity has started (or is about to start) on the closed circuit channel for the group. If the TV is turned off, then the set-top box may provide a visible indication, e.g., a flashing LED or an audible indication (e.g., a beeping or ringing pattern) to indicate pending or current broadcast activity. The viewer may then have a choice to watch the broadcast or to record it for later viewing.

In step 470, method 400 may optionally activate members' recording devices. For example, if a member has selected a preference for recording all broadcasts, then the service provider will activate the recording device for the member prior to the broadcast. In another example, the member may wish the broadcast to be recorded only whenever the viewer is tuned to another channel.

In step 480, method 400 may initiate other services for group interaction. For example, the customer may have requested a teleconference service that coincides with the broadcast to enable the customer and group members to have an audio interaction. Viewers may then share experiences and interject comments during the broadcast.

In step 490, method 400 broadcasts the media content to the members. For example, the customer begins transmitting the content towards the broadcast server and the broadcast server transmits the received content towards the group members on the closed circuit TV channel. Alternatively, the customer may have previously uploaded the media content to the broadcast server. The method then proceeds to step 495 to end the current session or to step 450 to receive a next request. Method 400 ends in step 495.

Those skilled in the art realize that the steps described in method 400 are not necessarily implemented in that specific order. For example, the server may receive the media content prior to identifying members of the group for the broadcast and so on. The above embodiment is not intended to limit the invention to a specific implementation.

In one embodiment, multiple groups may be combined for a broadcast session. For example, an extended family may wish to set-up multiple closed circuit TV channels and then requests a particular broadcast session to be directed to members of more than one group.

Figure 5:
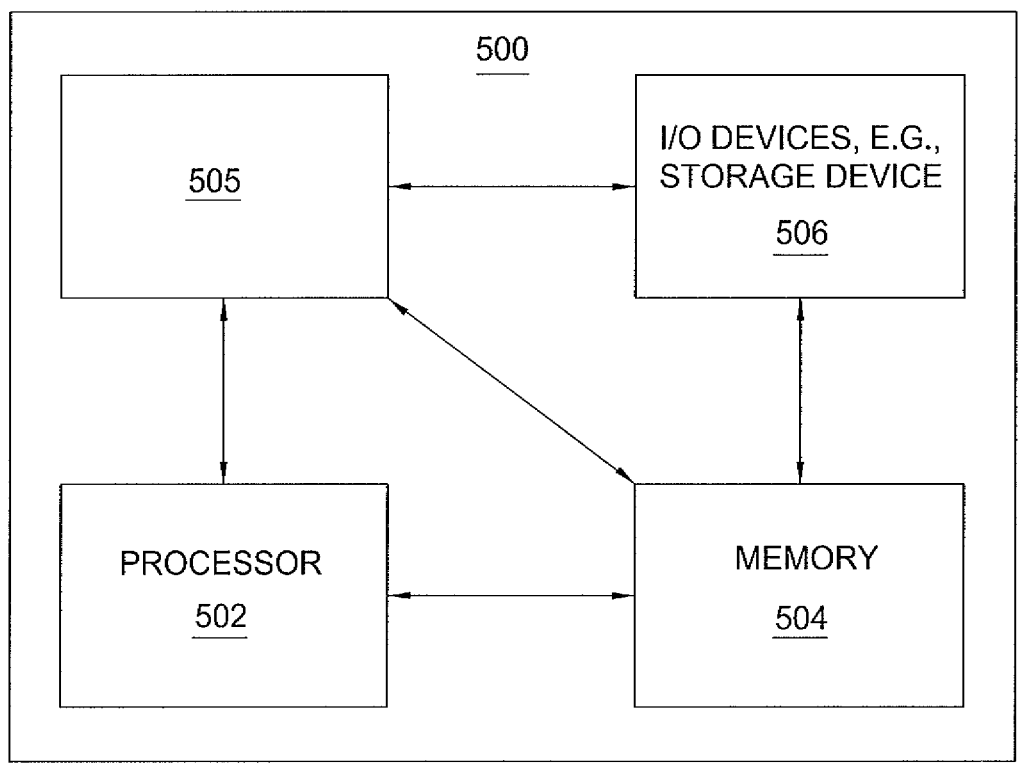
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing a closed circuit television channel service, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 505 for providing a closed circuit television channel service can be loaded into memory 504 and executed by processor 502 to implement the functions as discussed above. As such, the present method 505 for providing a closed circuit television channel service (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a private broadcast channel service, comprising:
   receiving, by a processor at a service provider of the private broadcast channel service, a list of members for a group from a subscriber, wherein a level of access for each member of the list of members is defined by the subscriber, wherein the private broadcast channel service comprises a closed circuit television channel that refers to a channel containing media content directed towards a specific list of destinations, wherein the level of access includes an access for a member of the list of members to provide the media content on the closed circuit television channel;
   contacting, by the processor, the list of members to receive a confirmation from each of the list of members to join the group for participating in the private broadcast channel service; and
   establishing, by the processor, the private broadcast channel service for a confirmed member of the list of members who has provided the confirmation to join the group, where the private broadcast channel service provides the media content on the closed circuit television channel to the confirmed member, wherein the media content is provided by the member who has the level of access to provide the media content on the closed circuit television channel.

2. The method of claim 1, further comprising:
   providing service information for accessing the private broadcast channel service to the confirmed member of the group.

3. The method of claim 2, wherein the service information comprises a channel number.

4. The method of claim 1, further comprising:
   providing a notification to the confirmed member when a broadcast is scheduled to begin.

5. The method of claim 4, wherein the notification comprises a message that is displayed on a display device if the display device is tuned to a different broadcast channel than the closed circuit television channel.

6. The method of claim 4, wherein the notification comprises a visible indication that is provided by a set-top box.

7. The method of claim 4, wherein the notification comprises an audible indication that is provided by a set-top box.

8. The method of claim 1, wherein the media content is provided by the confirmed member.

9. The method of claim 1, further comprising:
   activating a recording device for the confirmed member for recording the media content.

10. The method of claim 1, further comprising:
    providing a conferencing service to the confirmed member during a broadcast of the media content.

11. A non-transitory computer-readable storage medium storing a plurality of instructions which, when executed by a processor at a service provider of a private broadcast channel service, cause the processor to perform operations, the operations comprising:

receiving a list of members for a group from a subscriber, wherein a level of access for each member of the list of members is defined by the subscriber, wherein the private broadcast channel service comprises a closed circuit television channel that refers to a channel containing media content directed towards a specific list of destinations, wherein the level of access includes an access for a member of the list of members to provide the media content on the closed circuit television channel;

contacting the list of members to receive a confirmation from each of the list of members to join the group for participating in the private broadcast channel service; and establishing the private broadcast channel service for a confirmed member of the list of members who has provided the confirmation to join the group, where the private broadcast channel service provides the media content on the closed circuit television channel to the confirmed member, wherein the media content is provided by the member who has the level of access to provide the media content on the closed circuit television channel.

12. The non-transitory computer-readable storage medium of claim 11, further comprising:

providing service information for accessing the private broadcast channel service to the confirmed member of the group.

13. The non-transitory computer-readable storage medium of claim 12, wherein the service information comprises a channel number.

14. The non-transitory computer-readable storage medium of claim 11, further comprising:

providing a notification to the confirmed member when a broadcast is scheduled to begin.

15. The non-transitory computer-readable storage medium of claim 14, wherein the notification comprises a message that is displayed on a display device if the display device is tuned to a different broadcast channel than the closed circuit television channel.

16. The non-transitory computer-readable storage medium of claim 14, wherein the notification comprises a visible indication that is provided by a set-top box.

17. The non-transitory computer-readable storage medium of claim 14, wherein the notification comprises an audible indication that is provided by a set-top box.

18. The non-transitory computer-readable storage medium of claim 11, wherein the media content is provided by the confirmed member.

19. The non-transitory computer-readable storage medium of claim 11, further comprising:

activating a recording device for the confirmed member for recording the media content.

20. An apparatus, comprising:

a processor at a service provider of a private broadcast channel service; and a computer-readable medium storing instructions which, when executed by the at least one processor, cause the at least one processor to perform operations, the operations comprising:

receiving a list of members for a group from a subscriber, wherein a level of access for each member of the list of members is defined by the subscriber, wherein the private broadcast channel service comprises a closed circuit television channel that refers to a channel containing media content directed towards a specific list of destinations, wherein the level of access includes an access for a member of the list of members to provide the media content on the closed circuit television channel;

contacting the list of members to receive a confirmation from each of the list of members to join the group for participating in the private broadcast channel service; and establishing the private broadcast channel service for a confirmed member of the list of members who has provided the confirmation to join the group, where the private broadcast channel service provides the media content on the closed circuit television channel to the confirmed member, wherein the media content is provided by the member who has the level of access to provide the media content on the closed circuit television channel.

\* \* \* \* \*